(12) United States Patent
Goodwin et al.

(10) Patent No.: US 6,199,195 B1
(45) Date of Patent: Mar. 6, 2001

(54) AUTOMATICALLY GENERATED OBJECTS WITHIN EXTENSIBLE OBJECT FRAMEWORKS AND LINKS TO ENTERPRISE RESOURCES

(75) Inventors: Richard Glenn Goodwin, Oceanside; Michael Andrew Farrar; Marvin Messina, both of San Diego; Jason Steele, Lakeside, all of CA (US)

(73) Assignee: Science Application International Corporation, San Diego, CA (US)

(*) Notice: Subject to any disclaimer, the term of this patent is extended or adjusted under 35 U.S.C. 154(b) by 0 days.

(21) Appl. No.: 09/350,406

(22) Filed: Jul. 8, 1999

(51) Int. Cl.[7] .................................................. G06F 9/45
(52) U.S. Cl. .................................. 717/1; 717/2; 707/100
(58) Field of Search .................................. 717/1, 2, 3, 5; 707/3, 4, 10, 100, 103, 513; 709/315, 316

(56) References Cited

U.S. PATENT DOCUMENTS

| | | | |
|---|---|---|---|
| 5,499,371 | * | 3/1996 | Henninger et al. ................... 395/702 |
| 5,706,502 | * | 1/1998 | Foley et al. .............................. 707/10 |
| 5,761,499 | * | 6/1998 | Sonderegger ........................... 707/10 |
| 5,848,273 | * | 12/1998 | Fontana et al. ....................... 395/701 |
| 5,875,333 | * | 2/1999 | Fish et al. .............................. 395/702 |
| 5,890,158 | * | 3/1999 | House et al. ............................ 707/10 |
| 6,018,627 | * | 1/2000 | Iyengar et al. ........................ 395/701 |

OTHER PUBLICATIONS

Bowen, "Compuware sharpens Uniface", InfoWorld, Jun. 1997, pp. 50.*

No Author, "Component modeling tools encourage reuse", InformationWeek, Mar. 1997, pp. AD06.*

No Author, "Ptech and Open Engineering collaborate on Modeling environment for IDEF", Dec. 1998, pp. 1287.*

No Author, "Java Watch", Software Industry Report, Oct. 1998, pp. 7.*

Klein, "XML makes object models more useful", InformationWeek, Jun. 1999.*

Lindstrom, "Experiences of use cases and similar concepts", OOPSLA '92, Oct. 1992, pp. 123–130.*

* cited by examiner

*Primary Examiner*—Kakali Chaki
(74) *Attorney, Agent, or Firm*—Fitch, Even, Tabin & Flannery

(57) ABSTRACT

A method for generating source code objects has steps of generating a plurality of logical models using a plurality of modeling tools; translating each of the plurality of logical models into corresponding ones of a plurality of unified models; generating a system definition comprising a plurality of templates, each defining at least one service within a framework; and generating at least one source code object as a function of at least one of said plurality of unified models, and at least one of said plurality of templates. The method can be carried out in a system employing a plurality of modeling tools; a plurality of model adaptors; a repository adaptor tool receiving logical models from the modeling tools, and translating the logical models into unified models by applying ones of the plurality of model adaptors to the logical models; a schema repository; a schema server receiving the unified models and storing the unified models in a schema repository; a plurality of templates each defining at least one service within a framework; and a code generator generating source code objects as a function of ones of the templates, and ones of the unified models.

20 Claims, 6 Drawing Sheets

AUTOMATICALLY GENERATED OBJECTS WITHIN EXTENSIBLE OBJECT FRAMEWORKS AND LINKS TO ENTERPRISE RESOURCES

BACKGROUND OF THE INVENTION

The present invention relates to automatically generated source code, and more particularly to automatically generated object-oriented source code. Even more particularly, the present invention relates to automatically generated source code objects within extensible object frameworks and links to enterprise resources.

Object-oriented applications organize data and routines together into encapsulated units referred to as objects. Object-oriented applications lead to modular software systems that have increased flexibility and are easy to alter and maintain.

An object model is a formal description of an object-oriented application. Semantic elements of an object model describe object classes, attributes of object classes, relationships between object classes and inheritance between object classes. An object model provides a powerful mechanism to represent the real world, for example, because objects carry information about inherited characteristics and relationships with other objects.

For example, the object model of a patient record may contain many classes, such as "drug treatments." The drug treatments class can have attributes, such as "dosage"; relationships, such as "drug treatments" is related to "medications"; and inheritances, such as "anasesia" inherits from "medications".

The difference between a relational database management system and an object oriented application is that an object "knows" what operations can be performed on its data, whereas a relational database management system only has a set of generic operations that can be performed on its tuples. The semantics available in an object model are not preserved in a relational database. For example, in an object model "anasesia" knows that it is related to "drug treatment" and inherits from "medications". In contrast, a relational database represents this information as three separate data tables with no explicit representation of the relationships between the tables. The "drug treatment table" in a relational database might have foreign key information referring to the "medications table", but the representation of the relationship between "drug treatments" and "medications" is implicit. It is up to the developer to know about these relationships, what they mean, and how to handle them.

U.S. Pat. No. 5,499,371, (the '371 patent) for a METHOD AND APPARATUS FOR AUTOMATIC GENERATION OF OBJECT ORIENTED CODE FOR MAPPING RELATIONAL DATA TO OBJECTS, to Henninger, et al., on Mar. 2, 1996, incorporated herein by reference, describes a method and apparatus for using an object model of an object-oriented application to automatically map information between an object-oriented application and a structured database, such as a relational database. The assignee of the '371 patent, Persistences Software, Inc. of San Mateo, Calif., markets a product known as POWERTIER, that enables developers to work with relational data as a set of objects, and eliminates a large percent of the Structured Query Language (SQL) data access, Java Database Connectivity (JDBC) connection and translation management code within an application while simplifying issues such as object mapping, identity, caching and concurrency. The POWERTIER product includes an application server that enables developers to create thin-client applications based an Enterprise Java Beans (EJB) specification and consists of the following components: a POWERTIER live object server, which is a high performance, object application server for creating enterprise-class application based on Enterprise Java Beans, enabling developers to focus on developing business logic instead of issues such as object mapping, shared caching, transactions, notification and concurrency; POWERTIER object builder generates Java object classes that integrate application server objects with relational databases, working in conjunction with standard Java development environment to create Enterprise Java Beans deployment interfaces in classes; POWERTIER management is an Application Program Interface (API) providing a comprehensive management system for centralized server administration functionality, including configuration, monitoring, and reporting through a Java-based management Application Program Interface (API) for complete control of server cache management, thread pools, and database connection caching.

OBJECT MATTER business site framework is an object-relational Java framework that allows Java objects to be saved and retrieved from relational databases. OBJECT MATTER contains an object/relational mapping engine that automatically implements object persistence to relational databases, allowing a programmer to eliminate concerns about Java Database Connectivity (JDBC), instead focusing on an object model.

UNISQL/X provides a fully object-oriented data model that along with UNISQL/M multi-database system represents a client service database system with support for a full object-oriented paradigm, yet retaining capabilities of relational database systems including support for ANSI standard Structured Query Language (SQL).

Intersolv DATADIRECT simplifies data access in complex environments through high-performance, standards-based data connectivity for clients, servers and the world wide web, scalable from small projects to enterprise level projects. DATADIRECT includes support for object database connectivity (ODBC), Java Database Connectivity (JDBC) and OLE DB implementations on client/server and world wide web platforms across major operating systems, and access to at least thirty databases from local files to large enterprise databases.

Rougewave DB TOOLS.H++ provides portable, object-oriented access to leading relational database management systems, encapsulating Structured Query Language (SQL) 92 DML, including critical Structured Query Language (SQL), extensions, such as stored procedures. DB TOOLS.H++ also supports dynamic Structured Query Language (SQL), asynchronous database access, and is multi-thread safe. DB TOOLS.H++ supports development of applications that are portable across operating systems and among databases such as Oracle, Sybase, Informix, ODBC and MS SQL server.

The present invention advantageously improves upon the above-described approaches adding significant additional functionality and features either not provided in the above approaches or provided in a limited or otherwise disadvantageous way.

SUMMARY OF THE INVENTION

The present invention advantageously provides an approach for automatically generating source code, and specifically for designing and authoring source code within a complex business framework, and generating business objects with all implemented behaviors within a composed object service framework.

In one embodiment, the invention can be characterized as a method for generating source code objects. The method has steps of generating a plurality of logical models using at least one modeling tools; translating each of the plurality of logical models into corresponding ones of a plurality of unified models; generating a system definition comprising a plurality of templates, each defining a service within a framework; and generating at least one source code object as a function of at least one of said plurality of unified models, and at least one of said plurality of templates.

In another embodiment, the invention can be characterized as a system for generating source code objects. The system employs a plurality of modeling tools; a plurality of model adaptors; a repository adaptor tool receiving logical models from the modeling tools, and translating the logical models into unified models by applying ones of the plurality of model adaptors to the logical models; a schema repository; a schema server receiving the unified models and storing the unified models in the schema repository; a plurality of templates each defining a service within a framework; and a code generator generating source code objects as a function of ones of the templates, and ones of the unified models.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

Figure 1:
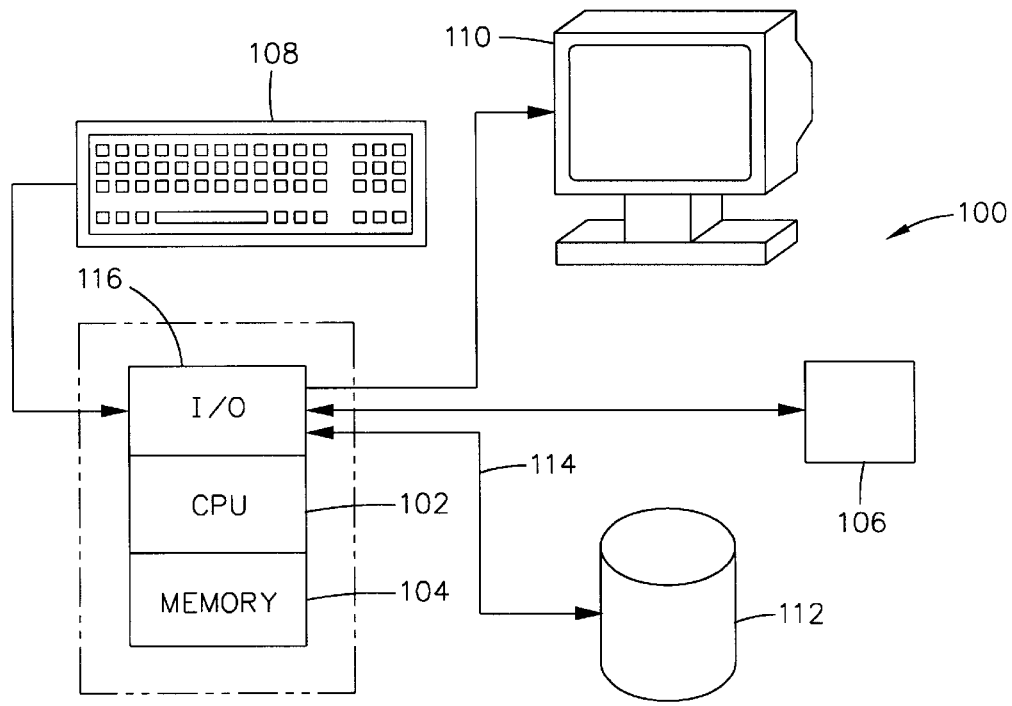
FIG. 1 is a schematic block diagram showing a computer system in which teachings of the present invention may be embodied.

The following description of the presently contemplated best mode of practicing the invention is not to be taken in a limiting sense, but is made merely for the purpose of describing the general principles of the invention. The scope of the invention should be determined with reference to the claims.

At the outset, it is helpful to clarify the general meanings of terms used in connection with object-oriented systems.

An "object class" is a set of data (attributes) and functional capabilities (routines) encapsulated into a single logical entity. For example, a "drug treatment" class may be characterized by a "dosage" attribute and an "administer-medication" routine.

An "object instance" is an embodiment (instantiation) of an object class. Instances are differentiated from one another by their attribute values, but not their routines (capabilities). For example, Jane Smith may be a first patient-object instance and Jon Doe may be a second patient-object instance. The term "object" is often used by itself to refer loosely to either an object class or an object instance, the difference being understood in context.

An "object-oriented application" is an operational computer program which when employed on an appropriate computer system uses a set of object instances that work in cooperation to perform useful work. For example, an object-oriented application could be built to manage patient records for a hospital, including such operations as admit new patient or administer medication.

An "object model" is a set of object classes that together form a blueprint for building an object-oriented application. Each object class of an object model can have attributes, inheritances, and relationships. Object models may be in the form of "logical models" generated by particular modeling tools and employing particular modeling languages, or "unified models" generated by a repository adaptor tool (or the like) and employing a unified modeling language, such as Unified Modeling Language (UML).

A "relationship" defines a link between two object classes. For example, a patient may be related to the doctor class. Each specific patient for example, "Jane Smith," would have a relationship with a specific doctor, such as "Dr. Jones". Relationships can be one-to-one, one-to-many, or many-to-many. An example of a one-to-one relationship can be a relationship between a patient and a room number such that each patient can have a single room number (assuming for purposes of this example, private rooms). An example of a one-to-many relationship can be a relationship between a patient and drug treatments such that each patient can be given multiple drug treatments. An example of a many-to-many relationship can be a relationship between patient and doctor such that each doctor serves many patients, and each patient can have multiple doctors.

"Attributes" are data elements of object classes which are expressed through particular values in object instances. The example, a patient class can have the attribute "name", and a particular patient instance can have the name value "Jane Smith."

An "object ID" is used to uniquely identify each object instance. The object ID can be generated in one of two ways. It can be generated by the application, which can automatically assign a unique object id for each new object instance. Alternatively, it can comprise a set of attributes that are guaranteed in the object model to always form a unique set of values for an instance. In this case, the create routine will require a unique set of attributes in order to create a new object instance.

A "routine" is a functional capability associated with an object class. For example, the routine "admit-patient" could be used to create (instantiate) a new object instance of the patent object class.

"Inheritance" represents a specialization of an object class in which the specialized class shares all of the attributes and routines of parent classes. Thus the patient class can inherit certain attributes, such as name, from the person class. In this case, the person class is called the "parent" of the patient class, and the patient class is called the "child" of the person class. As suggested above, and by way of further example, "anaesthesia" may inherit from "medications".

Inheritance can extend across many object class "generations." For example, the object class "drug treatments" can inherit from the object class "patient" which in turn can inherit from the object class "person". In this example, "person" is a parent of the object class "patient" and an ancestor of the object class "drug treatments".

Inheritance can be "vertical" (concrete) or "horizontal" (abstract) according to how the information corresponding to inherited attributes is stored in the database. In the case of vertical inheritance between two object classes in an object model, the database contains data associated with each object class. In the case of horizontal inheritance between two object classes in the object model, the database does not contain data associated with each object class. For example, suppose that there are two object classes, and that "patient" inherits from "person", and "doctor" inherits from "person." If this inheritance is vertical, then there can be a "person" table in the database which contains the attributes for each "person". If the inheritance is horizontal, there is no "person" table in the database. All the attributes of "person" are found in the "patient_data" table and in the "doctor_data" table. Horizontal and vertical inheritance can be mixed within the same object model.

The attributes, inheritances, and relationships of all the object classes of an object model are called the "semantics" or "semantic elements" of the object model. An object model contains certain information associated with its semantics. For each attribute, the object model contains information as to whether that attribute is to be associated with the object ID for the class. For each inheritance, the object model contains information as to whether the inheritance is vertical or horizontal (concrete or abstract).

Referring first to FIG. 1, a schematic block diagram is shown of a computer system in which teachings of the present invention may be embodied. The system comprises computing hardware and systems software that together support the execution of the improved system for generation of source code objects described herein. Software components of the improved system modify and direct the computing hardware and provides instructions by which methods of the present embodiment are carried out. The illustrated system 100 has a processor 102 coupled to a memory 104, a plurality of storage devices 106, and a user interface 108, 110, such as a keyboard 108 and screen 110 on which a graphical user interface (GUI) is implemented. The processor 102 is also coupled to hardware associated with the at least one database 112. The at least one database 112 includes a further storage device, such as a hard drive or a non volatile memory; structured data; and a database management system (DBMS). In some embodiments, the database 112 may have its own associated hardware, including a database processor (not shown) distinct from the above-mentioned processor 102. In other embodiments the database 112 is a software entity that modifies and is executed by the processor 102, in which case the network 114 may not be present. Such coupling may be via a network 114.

Also shown is an input/output section 116 coupled to the processor 102 providing input/output functions and interfacing between the user interface 108, 110, the plurality of storage devices 106, the network 114, and the database 112.

It will be appreciated by those skilled in the art that a wide range of computing system configurations can be used to support the methods of the present embodiment, including, for example, configurations that employ multiple processors, multiple databases, and/or widely distributed networks or inter-networks, such as the Internet. Specifically, the teachings of the present embodiment should be viewed as highly "scalable", meaning that as little as one computer system, and as many as several thousand or more computer systems may be used to implement the teachings of the present embodiment.

Figure 2:
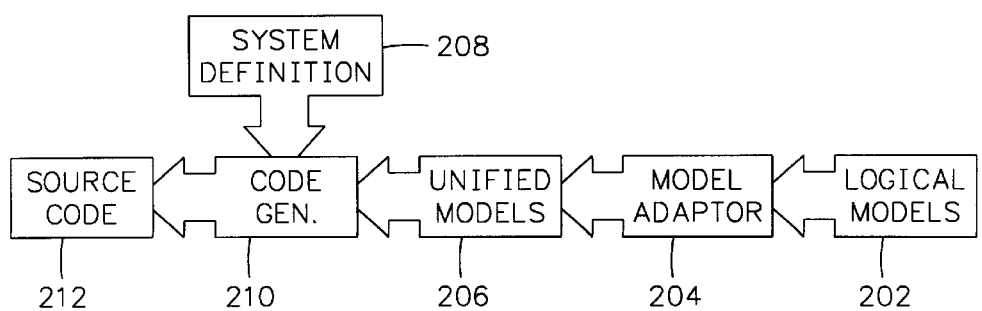
FIG. 2 is a high level block diagram illustrating functional elements of one embodiment of the present invention such as may be embodied in the computer system of FIG. 1.

Referring next to FIG. 2, a high level block diagram is shown illustrating functional components of one embodiment of the present invention, such as may be embodied in the computer system described above.

Shown are logical models 202, a model adaptor 204, unified models 206, a system definition 208, a code generator 210 and source code 212.

As shown, the logical models 202 provide an input to the model adaptor 202, which in turn has as its output the unified models 206. The unified models 206 and the system definition 208 are provided as inputs to the code generator 210, which generates the source code 212.

Together, these components comprise a system and method for designing and authoring source code objects, through which services can be composed within a complex business object framework, and for generating business objects with all implementations and behaviors within a composed object service framework.

The disclosed system and method allow object developers to design and author new object services, and to define how these services are composed within extensible frameworks with other object services. This is accomplished through object templates, which make up the system definition 208, and describe the object services and their dependencies in relationships to other object services as well as behaviors to be generated for objects within the framework.

The system and method will also allow developers to generate objects based on a framework of services they author by composing services based on the object templates into objects that support the composed behaviors and methods. This is accomplished through the code generator 210, which interfaces with the unified models 206, which are expressed in a unified modeling language, such as Unified Modeling Language (UML). UML was first introduced in early 1997 and, like other modeling languages is well documented. Thus, further definition is not made herein.

The unified models 206 together comprise a repository that manages object schema (i.e., the unified models 206) and their links to enterprises resources, such as databases and world wide web sites.

Executable programs (source code objects) are written by the code generator 210 in, for example, platform independent Java programming language, using the Common Object Request Broker Architecture (CORBA) 2.2 compliant, VISIBROKER Object Request Broker (ORB) for distributed objects. As a result, these source code objects are executable on any computer that has an installed Java browser and on which the VISIBROKER ORB exists.

Java Remote Method Invocation (Java RMI), or any other known or henceforth developed object-oriented programming language, or distributed transport mechanism, can alternatively be generated.

The disclosed system also provides a data server (described in reference to FIGS. 3 and 7) for performing run-time object queries that are transformed to access information from enterprise resources with results instantiated between business objects that are generated within the composed object service framework. This is accomplished through the use of an object query service (OMG compliant) and provides a CORBA service to which clients can submit object queries over generated objects and instantiated objects into objects with the composed behaviors defined by the framework.

During development-time, the disclosed system also allows object developers to define how these objects are mapped to enterprise resources such as to object oriented databases, world wide web resources, and relational databases. The disclosed system provides object oriented access to distribute heterogenous enterprise resources. The mapping of objects can initially be performed using any of a number of commercially available modeling tools, the output of which are the logical models 202. These logical models 202 are composed in a variety of modeling languages specific to the modeling tools with which they are created. At development-time, these logical models 202 are all converted to the unified modeling language, regardless of the modeling language in which they are composed, making up the unified models 206.

Large complex systems are composed of hundreds, if not thousands of business objects, and, various service specifications, such as CORBA common object service specifications (i.e., security, transaction, life-cycle, proxy, etc.), and require methods and behaviors to be implemented on each business object. Heretofore, no commercial product has been available for providing productivity development tools that allow a developer to detail object frameworks and/or to rapidly compose object services within multiple business object frameworks. The present embodiment provides a comprehensive capability for defining complex object frameworks through the system definition 208 (and the templates, described below, that make up the system definition 208), composed of multiple object services, and tools for developers to rapidly generate business objects based on formal object models within these frameworks.

The present embodiment also offers capabilities for specifying how these objects map to data resources. This mapping is manifest in the unified models 206. As a result, the present embodiment allows not only the comprehensive capability for defining complex object frameworks composed of multiple object services and tools, but also allows specification of how these objects map to data resources within the enterprise and allow clients to query against these objects, and, at run-time, to have results returned as objects within the complex object framework specified and tailored by a developer.

An important feature of the present embodiment is an ability to help the developer, at development-time, to rapidly generate business objects that are composed of behaviors from various object management services (persistence state, proxy object, life cycle, externalization, event, etc.) using an open framework. The present embodiment also allows developers to define unique (i.e., custom) services and unique behaviors that can be integrated into an object framework. At run-time, in the present embodiment, object management services utilize the objects that were generated using the code generator 210 to retrieve user data from distributed data sources as objects.

The code generator 210 allows application developers to define the system definition 208, which describes how new services are integrated into a business object framework. The system definition 208 provides application developers with a flexible approach for generating code from a data model. When a data model is loaded into the code generator 210, the model is converted first by the model adaptor 204 into the unified models 206. The unified models are then passed into each template (i.e., each component of the system definition 208) for code generation.

A developer defines which unified models are passed to each template or sub-template. This can be either a class, package, subclass, or any other unified model-defined object. Other unified models are accessed using control structures. The syntax of the templates supports any number of control structures followed by a block code. Control structures and code can be nested within one another. The present system also offers the unique advantage of user-defined language extensions. This tailorability allows developers to implement their own template syntax (parser and interpreter) in which templates can be implemented. The preferred syntax for the templates is JavaScript, although any of a number of well known or custom syntaxes can be used with relatively equal effectivity.

One advantage of the present embodiment is providing methods for developing the extensible application frameworks that can rapidly integrate object services as they become available from commercial sources or are developed as domain specific features by the developer. This level of extensibility and tailoring is unparalleled in heretofore available systems. The code generator 210 and the ability to rapidly integrate new object services (proxy, persistent state, domain specific services, etc.) into business objects provides a capability that is unique to the present embodiment and its system definition 208, and to integrating object models with object behaviors within a business object framework.

The present embodiment also provides methods for mapping object models to enterprise data sources, providing (at run-time) a powerful object query capability, and providing the above described benefit of rapidly integrating object services.

Hereinbelow is a more comprehensive description of the present embodiment accompanied by a more detailed block diagram illustrating the above-described basic features in detail.

Figure 3:
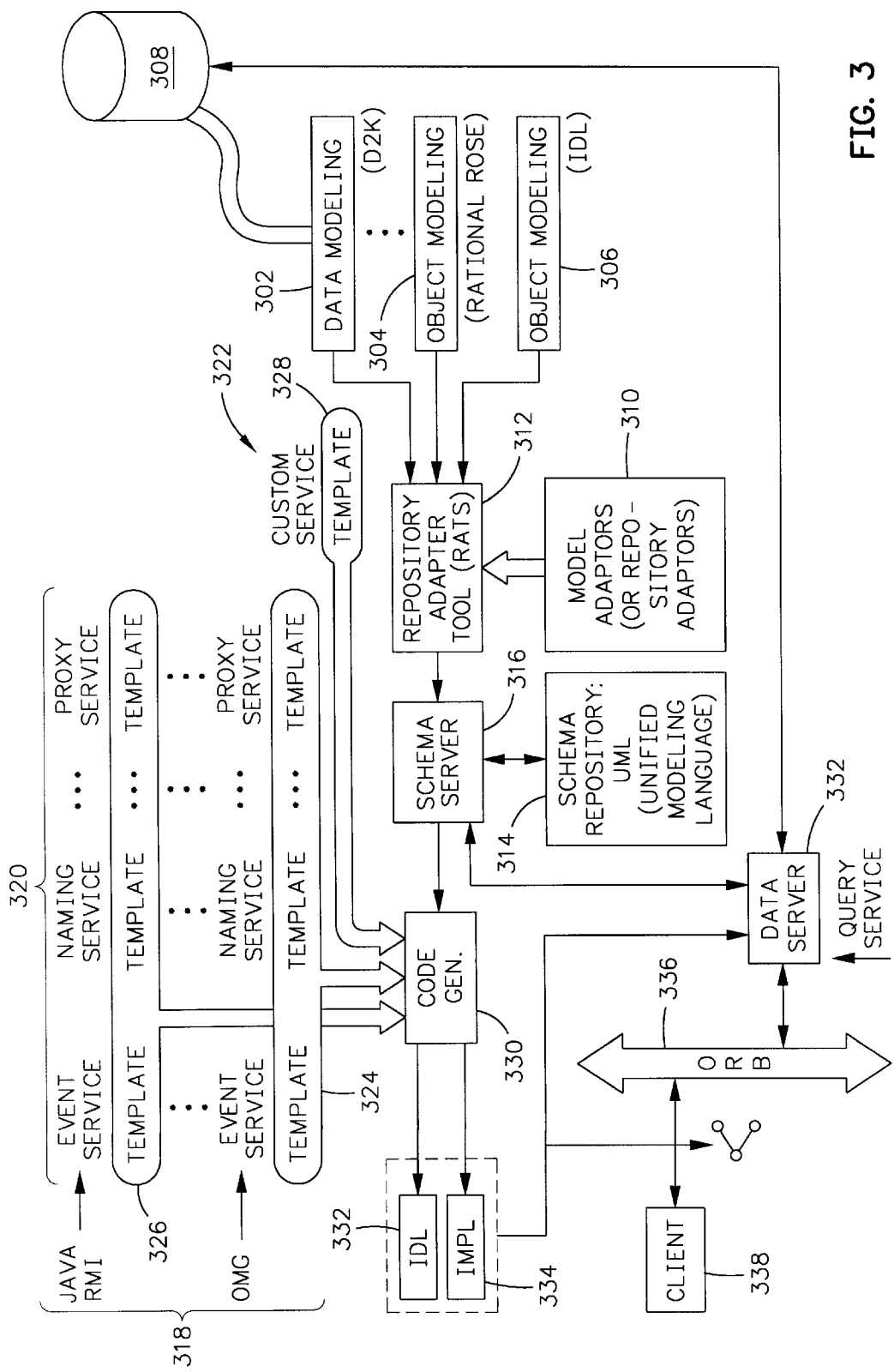
FIG. 3 is a detailed block diagram showing particular details of the embodiment of FIG. 2.

Referring next to FIG. 3, shown is a detailed block diagram showing particular features and aspects of the software system described above in further detail. Shown are a number of modeling tools 302, 304, 306 both data modeling 302 and object modeling 304, 306, defining data within a database 308 or defining objects and relating these objects to the data within the database 308. These definitions are referred to herein as logical models. Also shown are a plurality of model adapters 310 for defining a translation of the logical models of the modeling tools 302, 304, 406 into unified models, expressed in a unified modeling language, such as Unified Modeling Language (UML). A repository adaptor tool 312 takes the logical models generated by the modeling tools 302, 304, 306 (logical models 202 (FIG. 2)) and the model adaptors 310 as inputs and generates the unified models 206 (FIG. 2) in the unified modeling language. The unified models 206 (FIG. 2) are stored in a schema repository 314 accessed by a schema server 316. The unified models 206 (FIG. 2) from the repository adaptor tool 312 are received by the schema server 316 and stored within the schema repository 314.

Also shown are a number of operating frameworks 318, such as Java RMI, OMG, and COM (e.g., DCOM) standard database services. Each of these operating frameworks defines a plurality of services 320, such as the event services, naming services, proxy services and the like. Also shown is a custom service 322, such as might be developed for a particular application and/or for a particular end user by a developer.

A plurality of templates 324, 326, 328 define each of the services 320 for each of the operating frameworks 318 and for any custom services 322.

The templates 324, 326, 328 make up a system definition 208 (FIG. 2) and serve as inputs to a code generator 330 that uses the templates 324, 326, 328 along with the unified models 206 (FIG. 2) from the schema server 316 as inputs. The code generator 330 generates Interface Definition Language (IDL) source code objects 332 as well as implementation of methods source code objects 334 as a function of the data models embodied in the unified models 206 (FIG. 2) and as a function of the system definition 208 as embodied in the templates 324, 326, 328.

The code generator 330 provides an Application Program Interface (API) that allows other servers to connect, identify a model to be transformed into a server, and invokes code generation for that server. The objective of the server generated by the code generator 330 is to support Next Generation Information Infrastructure (NGII) services, interfaces, graphs of objects, and data aware objects. The Application Program Interface (API) is required by the schema server 316 (described below) as an infrastructure between the various components shown.

Some object services require every object to implement or inherit some interfaces to participate in the service. The code generator 330 supplies the source code objects required to implement these Next Generation Information Infrastructure (NGII) services.

The source code objects can be instantiated as, for example, CORBA or local objects. The code generator 330 will generate CORBA interfaces for each of the classes defined in a system.

Objects related to objects are represented by graphs of objects. Graphs of objects may reference local or CORBA objects or data sources. The code generator 330 will generate source code objects to support graphs of objects distributed in local or CORBA environments of references to data sources.

Once objects are modified, they must "know" how to save themselves back to the original data source. Such objects are called data source aware objects. The code generator 330 will generate source code objects to create data source aware objects.

The Application Program Interface (API) accepts, for example, a Unified Modeling Language (UML) graph as an argument. This unified modeling language graph is then traversed, parsed and used to generate source code objects. The code generator 330 writes source code objects to a directory and returns a uniform resource locator (URL) identified to a client application 338. An operator of the client application (338) is then required to go to the location identified by the uniform resource locator and download the generated code. Alternatively, the schema server 316 may provide a streaming interface that returns code to the client through, for example, an XMI interface or via a local file system, when executed in a non-client/server environment.

Further description of the code generator, supplementing the above general description, is made hereinbelow. The following, however, provides background information relative to the schema server that is helpful to further understanding the code generator.

The purpose of the schema server 316 is to make available meta-information (unified models 206 (FIG. 2)) defining a particular data system or database 308. This meta-information can be used for dynamic invocation, generation of code (development time) or knowledge of the structure of a data system (run time). The schema server 316 stores the meta-information formatted in accordance with a unified modeling language, for example Unified Modeling Language (UML), in the schema repository 314. Any authenticated utility can access the meta-information through the schema server 316 using a queryable interface and/or an Interface Definition Language (IDL) interface of a unified modeling language model (unified model 206 (FIG. 2)). The code generator 330 and the data server 332, in this sense, are client applications of the schema server 316. At development time, the code generator 330 accesses the schema server 316 and retrieves meta-information of a business application, as embodied in the unified modeling language, in order to generate code for every object class and object association.

The schema server's interface is an Interface Definition Language (IDL) interface that handles responses between services required, for example, to automatically generate a server. The schema server 316 implements an Application Program Interface (API) for all calls and supported services required for supporting the schema server 316 or the code generator 330.

At run time, the schema server 316 provides a queryable interface that provides functions for querying over the schema repository 314. To get a specific object or model from the schema repository 314, A client application 338 must traverse a unified model gaining full understanding of the unified model. The queryable interface provides an Application Program Interface (API) that allows entry points into the unified model at several levels: top, node or package level, the sub-system or model level, the class level, and the association level. The queryable interface also provides a means for depositing the model into the schema repository 314, managing versions of the unified model and handling meta-model information. The schema repository 314 is a variable footprint SQL-92-compliant database. The database is designed and an Application Program Interface (API) implemented in complete SQL-92 compliance. This allows a vendor to determine a commercial repository that will be used in support of the schema repository 314. The schema repository 314 stores information that models Object Management Group (OMG) Meta Object Facility (MOF) Interface Definition Language (IDL) interfaces.

The repository adaptor tool 312 has two primary parts. One part contains logic for processing different types of external repositories, for examples flat files and databases. The second part contains logic for understanding modeling structure retrieved from an external source and converting it to unified models.

Examples of model structures for the logical models are a relational model, for example, DESIGNER 2000, and the UML class/object model, for example, RATIONAL ROSE. The repository adaptor tool 312 provides a graphical user interface and framework for collection of adaptors that translate various logical models into unified models (i.e., models expressed in, for example, Unified Modeling Language (UML)) that can be stored in the schema repository 314.

The models are retrieved through the schema server 316 by, for example, the code generator 330 (at development time) and the data server 332 (at run time). Various adaptors are used by the repository adaptor tool 312 to implement a common interface between the various supported modeling tools and the schema server 316. The unified models are stored in the schema repository 314. The repository adaptor tool 312 initially connects to the schema server 316 to see if a particular unified model for a data source that a user wants to use already exists. It also connects to commit a unified model for storage in the schema repository 314. A log file is created by the repository adaptor tool 312 and can be used to validate translation of a source model to a proper unified model. Further examples of adaptors implemented in the repository adaptor tool can be used to adapt models from RATIONAL ROSE, DATABASE META DATA, IDL ADAPTOR, ORACLE DESIGNER 2000, XMI ADAPTOR; and in some variations, adaptors for adapting models from one modeling tool to another modeling tool such as from RATIONAL ROSE, to PROTEGE' ONTOLOGY, from schemaserver (e.g., UML) to RATIONAL ROSE; and from the schemaserver to PROTEGE' ONTOLOGY.

The schema repository 314 is a physical storage repository of unified models created by the repository adaptor tool 312 using the model adaptors 310, which describe the translation of an existing data model into a unified model. The mapping between unified models and other models is performed by establishing a relationship between the unified modeling language elements of the unified model and language elements from other modeling languages used in the logical modes.

The schema server 316 manages the schema repository 314 containing the unified models expressed in Unified Modeling Language (UML). The 316 describes complex object oriented systems and simple data sources to an enterprise via the unified models. The schema server 316 is teamed with the repository adaptor tool 312, which facilitates the creation of the unified models so that each module functions as an implementation of the object management group's (OMG) meta object facility (MOF).

The meta object facility defines and manipulates a set of meta models. An example of a model is a set of business objects that makes up a running software application. An example of a meta model is the language used to describe the object classes. More specifically, each model adaptor 310 loaded into the repository adaptor tool 312 imports a domain specific meta model (i.e., a logical model) and translates it into a unified model. The goal of the schema server 316 is to describe data structures and behaviors of various systems using the unified modeling language, so that the client application 338 can make high level decisions based on the data descriptions (unified models). Because information returned from the schema server 316 describes data, the returned values can also be referred to as meta data (and sometimes M2, distinguishing it from the schema repository 314, whose meta data can be referred to as M1). The meta data is distributed as, for example, CORBA interface objects as defined in the object management group's (OMG) Unified Modeling Language (UML) 1.1 specification documents, incorporated herein by reference.

Thus, the schema server 316 supports other software by describing object models. The 316 is related to multiple software components. As a part of an Next Generation Information Infrastructure (NGII) software enterprise architecture, the schema server 316 depends on other components of such architecture, and at the same time other components depend on the 316. The 316 interfaces with other components via CORBA interfaces. The Interface Definition Language (IDL) definition of these other components defines a common interface mechanism between CORBA objects. Specifically, the schema server 316 provides unified models describing classes that a user application is attempting, for example, to query. In this respect, the schema server 316 is supplanting standard CORBA interface repository facilities.

In order to communicate with each member of the enterprise, the schema server 316 uses standard distributed component architectures. The schema server 316 supports standard CORBA protocols, allowing clients to connect to the schema server 316 and to connect to other CORBA servers.

In order to communicate internally between schema server subcomponents, a combination of distributed component objects and specific proprietary mechanisms may be employed. However, communications are not under the direct control of the schema server 316 or its services because the connection preferably is made through Application Program Interfaces (APIs) that manage details of such communication.

By way of analogy, the schema server 316 manages a warehouse of blueprints, i.e., the schema repository 314. The schema server 316 itself is analogous to a clerk who retrieves the blueprints requested by visiting clients. The language burned into the blueprints is Unified Modeling Language, UML, and the architect creating the drawings is the repository adaptor tool 312. The repository adaptor tool 312, of course, uses logical models from various modeling tools to generate the unified models. Just as each pen stroke on a blueprint represents a unique structural feature of building, each object within a unified model represents a unique structural feature of a software system. More specifically, the objects describe all aspects of systems that have been modeled. One or more objects represent each component of a system, such as a structural feature or a behavioral feature. A single object easily defines a majority of system components, while some components must be represented with a graph of objects.

The schema repository 314 stores information about fixed models, such as structure of data sources. Consequently, the basic elements of information in the schema repository 314 are called meta data, while a unified models define how the meta data is organized.

While each building block in the schema repository 314 is an object, the composition of the schema repository 314 reflects specific goals of the schema server 316. The goal of the unified model is to describe high level application business objects that are familiar to developers. The meta data are objects that describe the application business objects in a domain-independent matter.

The unified model also represents structure of external data sources such as relational databases. In order to stay true to object oriented philosophy, the philosophy of meta information, and the correct representation of physical data, an object oriented system and a relational table system are represented in the unified model. Software classes maintained by developers, such as interfaces defined in Interface Definition Language (IDL) files or classes, or C++ header files are the definitions of applications of business objects.

When the class definitions are modeled into the schema repository 314, at least one meta data object exists in the schema repository 314 for each application business object being modeled. A meta data object that represents an application business object is located in an object oriented system of the schema repository 314. The associations between application business objects are also translated into meta data objects that exist in the schema repository 314. Meta data objects can also be modeled into case tools, such as RATIONAL ROSE. One benefit of using a case tool is the ability to graphically associate meta data objects. Meta data objects in an object oriented system can be associated with meta data objects in an intricate-relationship system but cannot be associated with objects in the schema description system.

The repository adaptor tool 312 is designed to facilitate transformation of the logical models 302, 304, 306 into the unified models of the schema repository. At design time, the repository adaptor tool 312 loads the available model adapters 310. The model adaptors 310, such as in an adaptor for DESIGNER 2000, parse specific types of logical models 302, 304, 306 and translates the logical models 302, 304, 306 into unified models. The creation of unified models 314 is performed through a common Application Program Interface (API) layer. The repository adaptor tool's Application Program Interface (API) layer creates objects that can be traversed for user defined purposes, before the unified models are committed to the schema repository 314, thereby making the unified model available for later use.

Referring again now in more detail to the code generator 330, the code generator 330 is a model driven application that reads the object elements from the schema server 316 and applies a set of known templates 324, 326, 328 for a set of services 320 for a given framework 318 to the object elements of the unified models to produce a set of source code objects 332, 334. The templates 324, 326, 328 define what is the language of the code (e.g., Java or C++) and the unified model determines what is generated. The user passes to the code generator 330 either a model name of a unified model stored within the schema repository 314 (and the model determines what is generated), or a CORBA Interface Definition Language (IDL) file from model input. The code generator 330 interfaces with the schema server 316 and the schema repository 314, where the unified models are stored.

Inputs to the code generator 330 include CORBA, Interface Definition Language (IDL) files and object oriented or data models stored in the schema repository 314.

Figure 5:
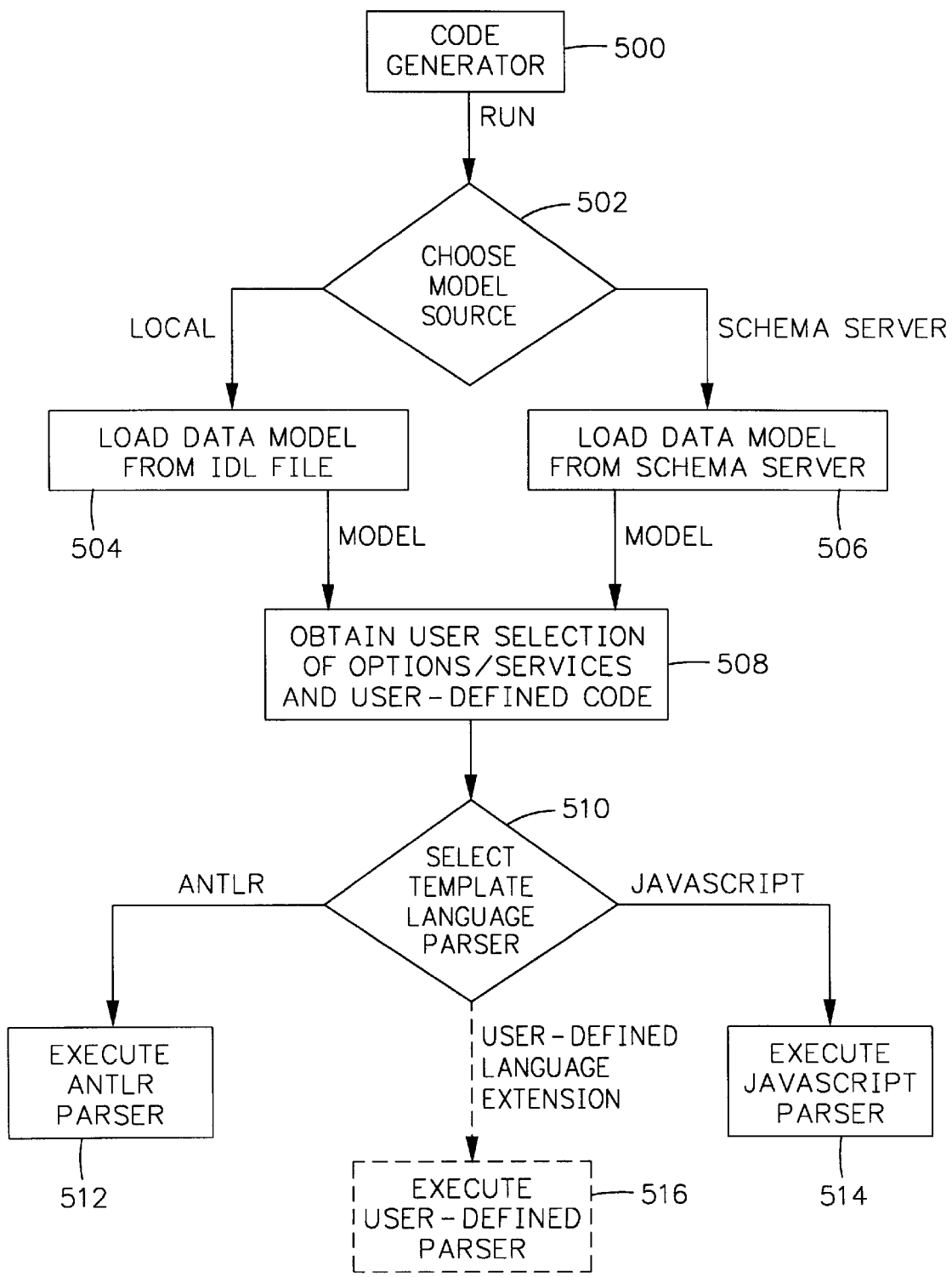
FIG. 5 is a flow diagram illustrating steps traversed by the code generator during development time code generation by the embodiment of FIG. 2.

Options for code to be generated are stored in a properties file that specifies one or more template files. After either the local data model is loaded (Block 504, FIG. 5) or the schema server data model is loaded (Block 506, FIG. 5), the user options for code to be generated are obtained (Block 508, FIG. 5).

Thus, when the code generator 330 is instantiated (Block, 500, FIG. 5) a selection (Block 502, FIG. 5) is made as to whether a local (IDL) data model source is being used or a schema server data model is being used. If a local data model source is being used, the local data model is loaded (Block 504, FIG. 5); if a schema server data model is being used, the schema server data model is loaded (Block 506, FIG. 6). Thus, the code generator 330 can support the creation of, for example, IDL, JAVA or C++ files (CORBA, Java RMI, and/or COM) based on certain user preferences and selections. After user option is are obtained (Block 508, FIG. 5), a template language parser is selected (Block 510, FIG. 5). Once the template language parser, which may be a parser for virtually any computer language, for example, another language recognizer (ANTLR) parser, a Java Script parser or a user defined parser is selected (Block 510, FIG. 5), the appropriate parser is executed (Blocks 510, 512, 514, FIG. 5).

The templates 324, 326, 328 (which may, for example, be written in JavaScript) are used to specify various services and operations to be supported. Output from the code generator 330 can be combined with other user defined codes to create an application. The code generator 330 reads in unified models from the schema server 330 or from an Interface Definition Language (IDL) file and then applies the set of templates specified in the properties file to support each of the selected services. User's own code can be combined with the generated files to produce a resultant code library. The library includes user defined behaviors and support for each of the selected services for the given framework, and for interacting with the particular data model represented in the unified model.

Figure 4:
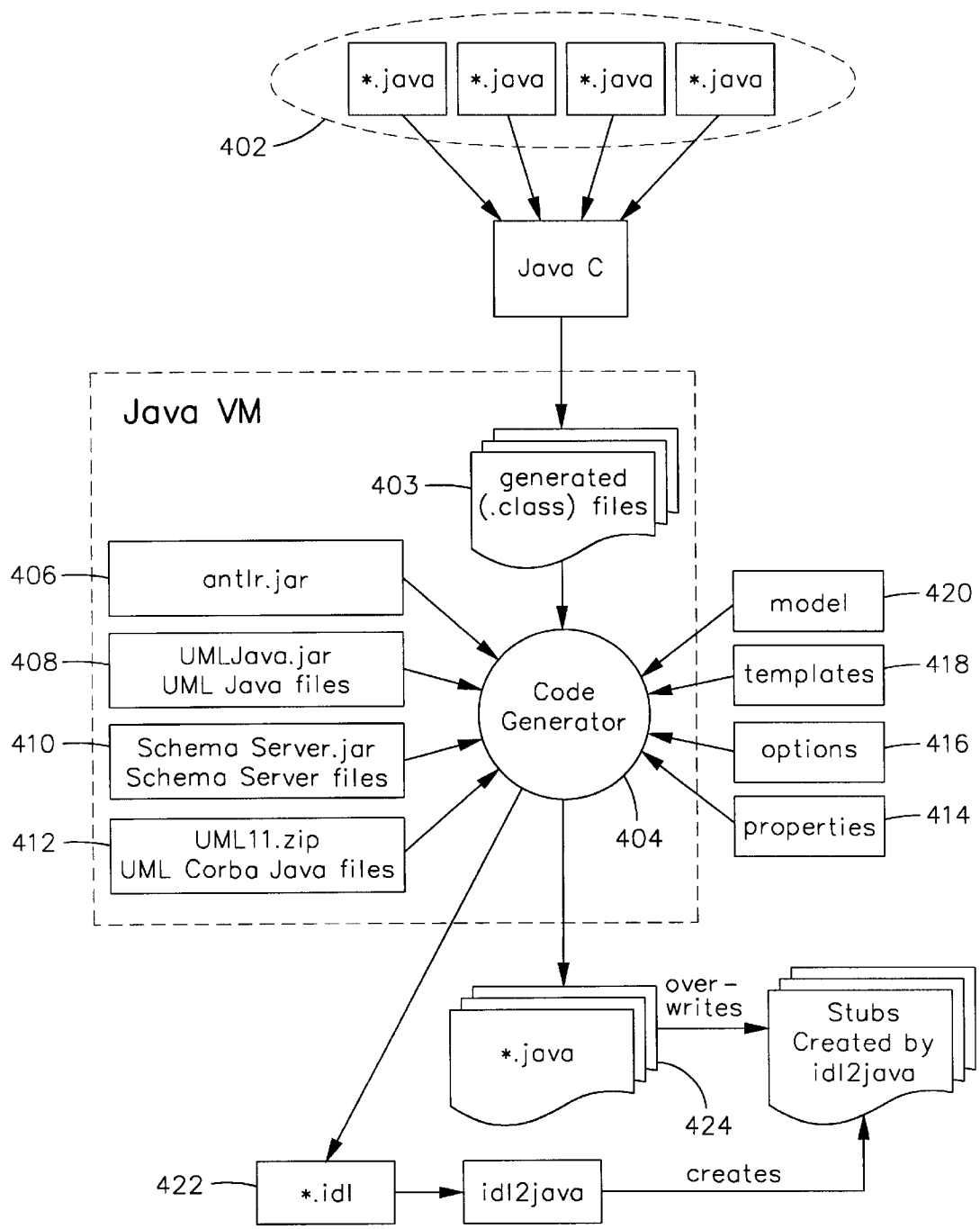
FIG. 4 is a block diagram showing architectural elements of a code generator suitable for use in the embodiment of FIG. 3.

Referring next to FIG. 4, a detailed view of architectural elements is shown in a block diagram. "*.java" files shown inside a dashed oval 402 represent a set of files created by any language recognizing parser (ANTLR (another language recognizer), shown as an example in the present embodiment, is widely available as shareware) based on grammar files. These "*.java" files are compiled and collected as .class files 403. Inputs to the code generator 404 include the "*.java" files 402 generated by the language recognizing parser from grammar files (not shown); ANTLR.jar files 406, which are compiled ANTLR files required during development time execution of the code generator 404; UMLJava.jar files 408, which are compiled .class files for creating and referencing UML Java objects; schemaserver.jar files 410 which are an interface providing access to schemaserver model information; UML11.zip 412 are a CORBA interface providing UML 1.1 types; properties 414, which are specifications of user defined input, e.g., programming languages, services required, templates to be used, etc.; options 416, which are specifications of options to be used for particular templates; templates 418, which are templates to be used for a current execution of the code generator 404; and models 420, which are inputs for a particular model, e.g., an Interface Definition Language (IDL) file. Outputs from the code generator 404 include Interface Definition Language (IDL) files 422 (*.idl), which are processed by an idl-to-Java compiler, e.g., Visibroker's IDL2JAVA, for the generation of CORBA ORB services; and *.java files 424 that contain source code for specific operations, and will replace corresponding files (stubs) that are autographed by the idl2java compiler.

To modularize and simplify the design of the code generator 404, a set of repository adaptors 310 has been created and is employed by the repository adaptor tool 312 (FIG. 3). Each of the repository adaptors 310 is designed to interface with a particular type of modeling tool. The present design supports easy extension of current capabilities to anticipate future requirements. The capabilities of the present design of the code generator 404 include parcing of Interface Definition Language (IDL) files, as well as DESIGNER 2000 models.

Before the code generator 404 is run to create a required set of files, the language recognizing parser is executed to create the "*.java" files 402 for each grammar (e.g., idl.g) that will be used in code generation. The generated "*.java" files are used by the code generator 404 during development time for specific Interface Definition Language (IDL) and template files. The grammar files are not part of the language recognizing parser, and are written to support specific services, in this case, the parcing of Interface Definition Language (IDL) into graphs of objects.

A template parser package within the code generator 404 contains classes used to support development time parsing of non-JavaScript templates, i.e., *.tmpl files (templates). These classes represent a collection of files created by the language recognizing parser from top_template.g and inner_template.g grammars, and classes written specifically for the code generator 404.

The code generator 404 offers a unique advantage of defining additional template language extensions. This tailorability allows developers to implement template syntax (parser and interpreter) in which templates can be implemented. This can be accomplished using other grammar packages not reliant on the language recognizing parser, e.g., ANTLR.

Figure 6:
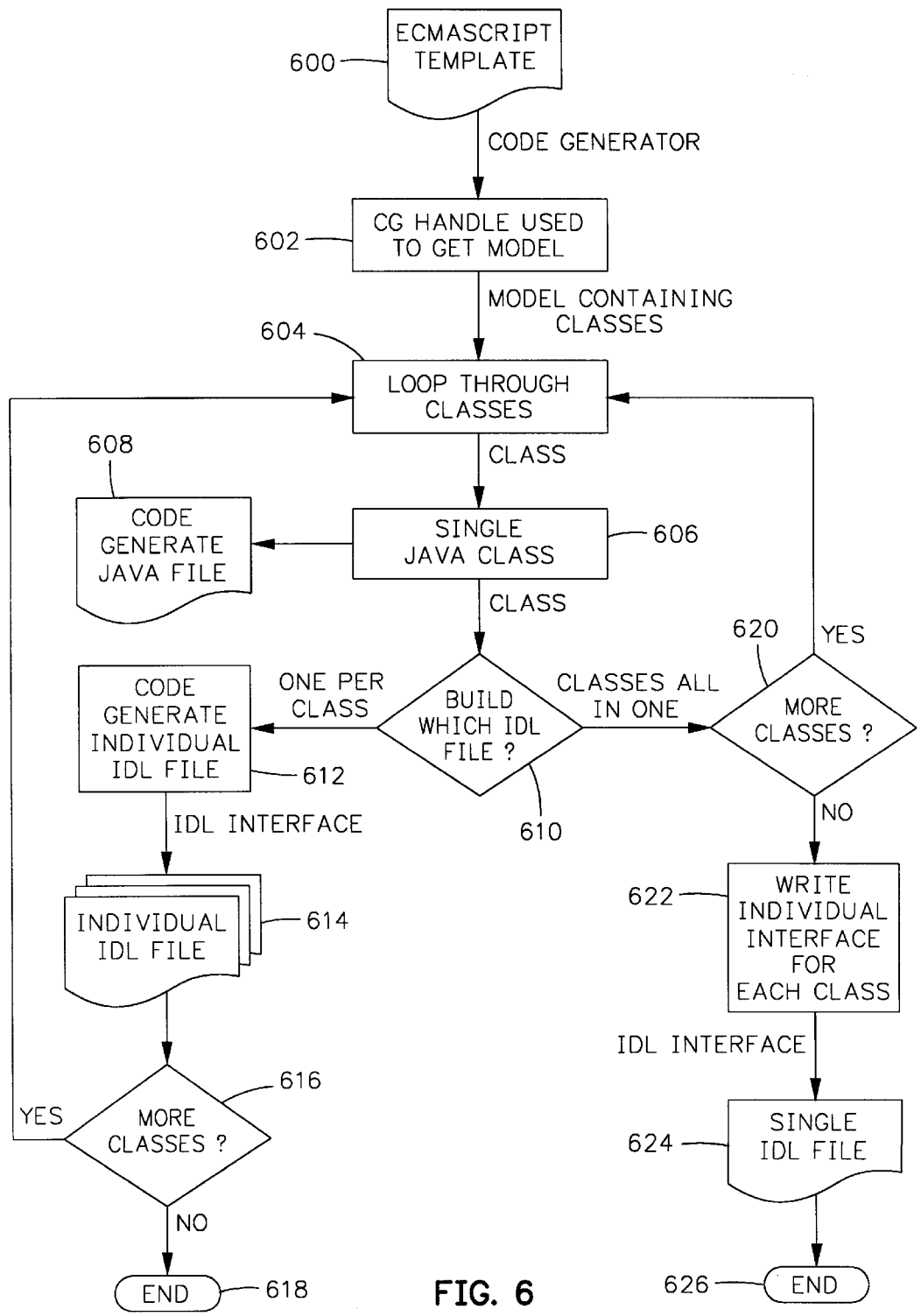
FIG. 6 is a flow diagram illustrating steps traversed by a java parcer during execution of the code generator during development time in FIG. 5.

Referring next to FIG. 6, a flowchart is shown of steps traversed by the code generator, and more specifically, a parser component of the code generator during development time code generation. All the steps depicted in FIG. 6 are executed within the respective "execute" blocks (Blocks 512, 514, 516), depicted in FIG. 5.

A template is retrieved (Block 600) by the code generator as specified by the parameters file, and one or more unified models are retrieved (Block 602) through the schema server into the code generator. The various classes defined in the unified model are traversed (Block 604) with a java file being generated by the code generator (Blocks 606, 608) for each class. A determination is the made (Block 610) as to whether a single IDL file will be generated for all classes or one IDL file per class will be generated, as determined by the parameters file. If one IDL file per class is to be generated, the individual IDL file is generated (Block 612) and stored (Block 614). A determination is then made (Block 616) as to whether there are more classes defined by the unified model, and if not, the code generator terminates (Block 618) code generation. In the event that there are more classes to be processed, the code generator continues looping (Block 604) through the class, generating and storing code (Blocks 606, 608), generating individual IDL files (Block 612), storing the IDL files (Block 614), determining whether more classes are to be processed (Block 616), and terminating this looping, once all classes have been processed (Block 618).

In the event all classes are to be placed into single IDL files, a determination (Block 620) is made following generation of the java file (Blocks 606, 608), as to whether there are more classes. In the event there are more classes, the looping continues (Blocks 604, 606, 610, 620), until all classes have been processed by the generation of java files. Then, an individual interface is written (Block 622) for each class, and a single IDL file is generated (Block 624). Following generation of the single IDL file, processing by the code generator terminates (block 626).

Referring back to FIG. 3, a third major element of the present embodiment is the data server 332. The data server 332 operates at run time (unlike the code generator, which is a development tool operating at development time). The data server 332 provides query services to access legacy databases, making available, in standard formats, data from a variety of sources.

The data server 332 is coupled to the schema server 316 and to the database 308 modeled by the modeling tools. The data server 332 also utilizes the Interface Definition Language (IDL) source code 332 and implementation source code 334 from the code generator 330.

When deployed within a client application, the data server 332 launches, starts, manages and controls execution of a set of services. The data server 332 provides a generic launcher of, for example, CORBA objects and serves as a generic manager of, for example, CORBA objects. Manager applications can connect to the data server 332, check the state of execution, collect statistics and reconfigure the data server 332 if necessary.

The first step in this process constitutes defining a classical CORBA server that contains logic for a generic CORBA server containing such functionality as initializing an Object Request Broker (ORB) 336 and providing a main cycle for Object Request Broker (ORB) connections. Another important function is to authenticate client/server programs in order to guarantee security at the software product level.

A second step is to define the data server class that allows launching and managing the services of the data server 332.

A query evaluator, query manager, and query interfaces of the data server 332 allow executing a query. The query evaluator immediately executes a query. The query manager allows immediate execution of a query both by inheriting from the query evaluator and by the creation of a query object. The query interface allows executing a query in two steps, preparation and execution, used when a query is going to be executed multiple times with different parameters.

In the present embodiment, the query service is based on five types of query managers: a general query manager, an SQL query manager, an OQL query manager, a WWW query manager, and a video query manager. Any query manager could be used by an application, however, the general query manager offers the option of a single point of contact so applications do not have to connect to different managers depending on the type of query. The general query manager will contact the appropriate query manager for the query to be executed. The SQL query manager allows SQL queries over Relational Database Management Systems (RDBMS) such as Oracle, Sybase and the like. The OQL query manager queries relational databases, such as Oracle, Sybase and the like, but returns objects instead of plain information. The WWW query manager will allow boolean queries over web search engines such as ALTA VISTA, LYCOS and the like. The video query manager will allow boolean queries over video data sources. The OQL query manager will allow OQL queries over a predefined object schema.

The unified models contain mappings about the data sources of each of the classes. The class can be made of multiple data sources; the data sources can be again SQL, object (or OQL), WWW or video data sources. The OQL query manager will convert the OQL statement to various native statements depending on whether the source is SQL, WWW or video. The results of the query will be a collection of first class objects.

This structure allows a hierarchy of query managers. In the case of the general query manager, it will use the other query managers to actually solve the queries. In the case of the OQL query manager, the other query managers are used to solve part of an OQL query, but the OQL query manager will generate the final result. Each of the query managers that allows modification of information (insert, update or delete) must support distributed transactions. The query managers will support a BEGIN TRANSACTION, TRANSACTIONS (queries), and an END TRANSACTION (commit), or an ABORT TRANSACTION (rollback).

The data server 332 accepts queries from the client 338 application in standard formats which it then translates, as necessary, to interact with diverse data sources. In other words, it provides a uniform, object-oriented access to distributed legacy data sources by acting as an object oriented dynamic front into existing databases. The data server 332 employs the unified models to provide the clients 338 periodically updated query-based views of distributed heterogeneous databases.

The first step in preparing to use the data server 338 (i.e., preparing the data server 338 for run time operation) consists of developing a unified model of a business application and storing that model in the schema repository 314. (This is a development time step.) The second step is to run the code generator 330 to generate the source code objects that will support the services in the Interface Definition Language (IDL) file that describes the interface of the objects to the business applications. (This is also a development time step.) The third step consists of compiling the Interface Definition Language (IDL) file to generate the sub code to connect the client 338 and the server. (This is a development time step.) The fourth step is adding the code from the developer that actually implements the methods defined for the unified models, and any custom services or user defined code from the developer. (Business logic is included in this step; this step is a development time step.). The fifth step consists of compiling all of the sources of the project, which are stub code generated by the interface definition language (IDL) compiler from the interface definition language (IDL) files generated by the code generator 330 (this code is used to connect the client 330 and the server in a CORBA system), the code generated by the code generator 330 to support the services; the developer's code, which contains the business logic; and any library used by the developer to implement the business logic or the stub code or the code generation code. (This is a development time step.) The sixth step consists of installing the "executable" code in a directory or store where the data server 332 can retrieve it in order to instantiate the objects. (This is also a development time step.)

Once the business applications have been developed, they can make use of the generated servers and objects to produce CORBA client applications. Two servers involved in this process are the data server 332 and the schema server 316. The data server 332 is composed by the different AITLS services and the schema server 316 is a server providing information to the business applications. The first step in this process consists of connecting to a naming service that provides localization of the AITLS services. The second step of the process consists of connecting to the AITLS service by making a connection to the object reference provided by the naming service. The third step of the process consists of using the AITLS service by following the specification of the service. The fourth step can be an AITLS service connecting to the schema server 316 to get meta information to solve the business application request. The fifth step may be an AITLS service connecting to a data source or a persistent repository to get stored data or to solve a business application request. A sixth step may be a business application connecting to the schema server 316 to obtain meta information of its own model.

The data server 332 will launch, store, manage and control execution of a set of services. As a result, the data server 332 provides a generic launcher of, for example, CORBA objects and server as a generic manager of CORBA objects.

The data server 332 includes the query server that employs a query evaluator, query manager and query interfaces, described above, to allow executing a query.

Figure 7:
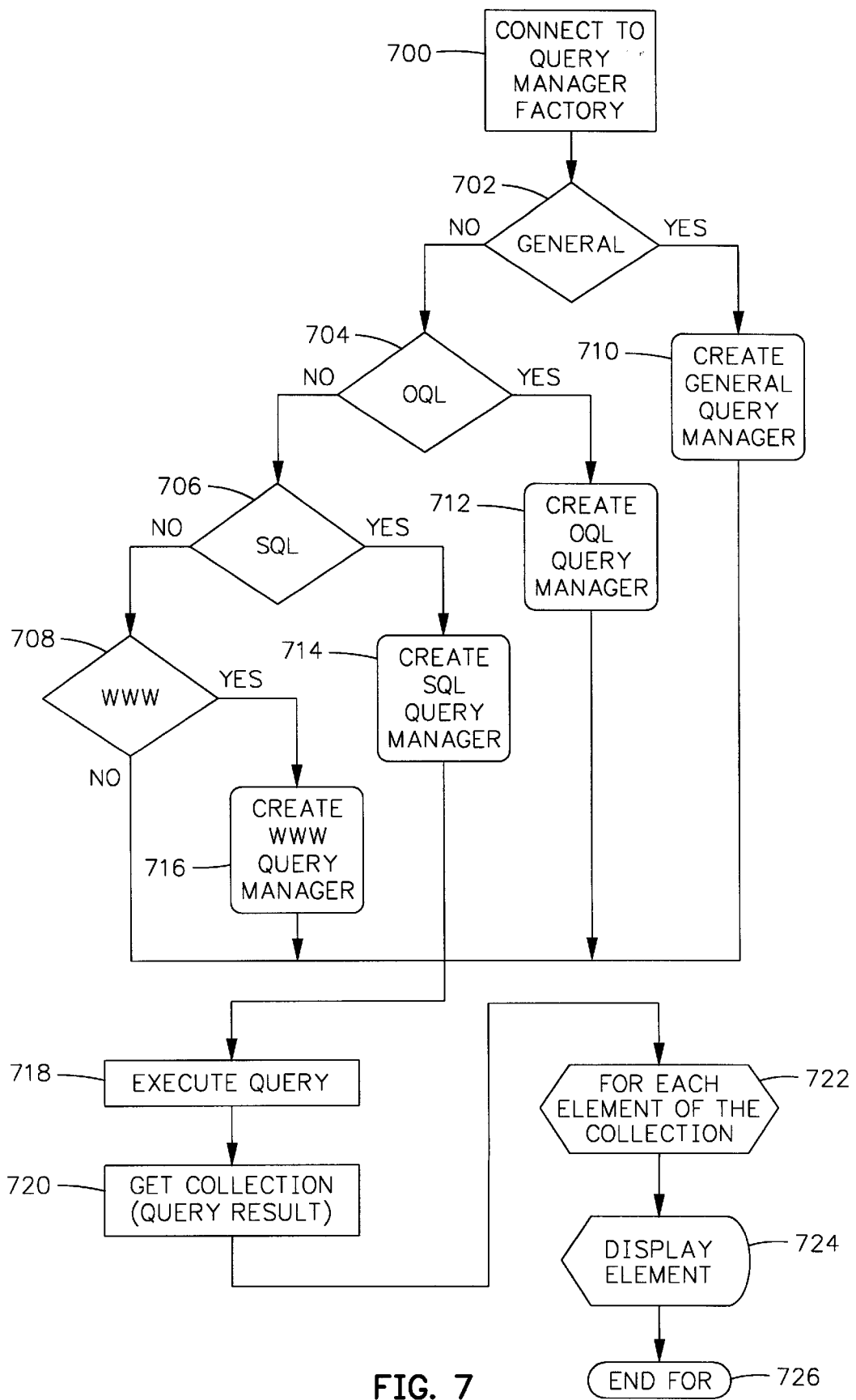
FIG. 7 is a flow diagram of steps traversed by a data server during run time in the embodiment of FIG. 2.

Referring next to FIG. 7, a flow chart is shown illustrating steps traversed during run time execution of the data server. Initially (Block 700) a connection is made through an appropriate application program interface to the data server. Next, determination is made as to whether, for example, the data source is a general, OQL, SQL, or WWW data source (Block 702, 704, 706, 708). In response to this determination, an appropriate query manager is created (Block 710, 712, 714, 716). The appropriate query manager receives and executes a query from a user process (Block 718). In response to execution of this query, the data server retrieves a query result (Block 720) and returns each element of the query result by looping through an appropriate loop that passes each element to the user process or displays each element on a display (Block 722, 724, 726). After the last element has been passed or displayed, the data server has completed processing the query.

While the invention herein disclosed has been described by means of specific embodiments and applications thereof, numerous modifications and variations could be made thereto by those skilled in the art without departing from the scope of the invention set forth in the claims.

What is claimed is:

1. A method for generating source code objects comprising:

generating a plurality of logical models using a plurality of modeling tools;

translating each of the plurality of logical models into corresponding ones of a plurality of unified models;

generating a system definition comprising a plurality of templates, each defining at least one service within a framework; and generating at least one source code object as a function of at least one of said plurality of unified models, and at least one of said plurality of templates.

2. The method of claim 1 wherein said translating of said logical models comprises generating at least one Unified Modeling Language (UML) element.

3. The method of claim 1 wherein said generating of said system definition comprises generating in one of said plurality of templates at least one JavaScript element.

4. The method of claim 1 wherein said generating of at least one source code object comprises generating at least one interface definition language element.

5. The method of claim 1 further comprising:

defining a plurality of adaptors, each defining a translation from one of a plurality of modeling tools.

6. The method of claim 1 further comprising:

storing said plurality of unified models in a schema repository;

wherein said generating of said source code objects comprises retrieving selected ones of said plurality of said unified models.

7. The method of claim 1 further comprising:

retrieving data from a database by employing said source code objects and said unified models to define a relationship between an object oriented database query and the data.

8. A system for generating source code objects comprising:

a plurality of modeling tools;

a plurality of model adaptors;

a repository adaptor tool receiving logical models from the modeling tools, and translating the logical models into unified models by applying ones of the plurality of model adaptors to the logical models;

a schema repository;

a schema server receiving the unified models and storing the unified models in a schema repository;

a plurality of templates each defining at least one service within a framework;

a code generator generating source code objects as a function of ones of the templates, and ones of the unified models.

9. The system of claim 8 wherein said schema repository comprises said unified models, each comprising at least one Unified Modeling Language (UML) element.

10. The system of claim 8 wherein each of said plurality of templates comprises at least one JavaScript element.

11. The system of claim 8 wherein said source code object comprises at least one interface definition language element.

12. The system of claim 8 further comprising:
a data server providing query services, wherein the data server receives at least one of said source code objects and at least one of said unified models, and further receives an object oriented query.

13. The system of claim 12 further comprising:
a database, wherein the data server retrieves data from the database as a function of said object oriented query.

14. The system of claim 13 further comprising:
a client application generating said object oriented query.

15. The system of claim 14 further comprising:
an object request broker for communicating said object oriented query from said client application to said data server.

16. The system of claim 8 wherein said framework comprises Java RMI.

17. The system of claim 8 wherein said framework comprises an Object Management Group (OMG) framework.

18. The system of claim 8 further comprising another plurality of templates each defining at least one service within another framework.

19. The system of claim 18 further comprising another template defining a custom service.

20. The system of claim 8 further comprising another template defining a custom service.

* * * * *